United States Patent [19]

Garel-Jones et al.

[11] Patent Number: 4,723,828
[45] Date of Patent: Feb. 9, 1988

[54] BANDWIDTH ENHANCEMENT OF MULTIMODE OPTICAL TRANSMISSON LINES

[75] Inventors: Philip-Michael Garel-Jones, Ottawa; Richard S. Lowe, Kanata, both of Canada

[73] Assignee: Northern Telecom Limited, Montreal, Canada

[21] Appl. No.: 670,233

[22] Filed: Nov. 9, 1984

[51] Int. Cl.⁴ .......................... G02B 6/26; G02B 6/16
[52] U.S. Cl. ............................. 350/96.15; 350/96.10; 350/96.29
[58] Field of Search ............... 350/96.15, 96.29, 96.30, 350/96.31

[56] References Cited

U.S. PATENT DOCUMENTS

| | | | |
|---|---|---|---|
| 4,176,911 | 12/1979 | Marcatili et al. | 350/96.30 X |
| 4,447,124 | 5/1984 | Cohen | 350/96.30 |
| 4,515,436 | 5/1985 | Howard et al. | 350/96.30 |
| 4,529,262 | 7/1985 | Ashkin, Jr. | 350/96.15 |
| 4,557,556 | 12/1985 | Decker, Jr. | 350/96.15 X |
| 4,557,557 | 12/1985 | Gleason et al. | 350/96.15 X |

Primary Examiner—William L. Sikes
Assistant Examiner—Akm E. Ullah
Attorney, Agent, or Firm—Schwartz, Jeffery, Schwaab, Mack, Blumenthal & Evans

[57] ABSTRACT

To improve pulse dispersion of a multimode fiber transmission line, it is spliced to a short length of fiber adapted to strongly attenuate mode groups propagating near the core center.

10 Claims, 6 Drawing Figures

BANDWIDTH ENHANCEMENT OF MULTIMODE OPTICAL TRANSMISSON LINES

BACKGROUND OF THE INVENTION

This invention relates to a method for improving the bandwidth of multimode fiber lengths and to multimode transmission lines having improved bandwidths.

One of the signal distortion mechanisms existing in fibers used in light wave communications is inter-modal dispersion. Such dispersion arises because light passing along a fiber is distributed into a number of modes which vary in propagation velocity. At a particular wavelength, each mode group has its own velocity and since a coupled light source generally splits into a number of mode groups, a light pulse transmitted along the fiber broadens towards the output end.

To some extent the propagation velocity of individual modes or mode groups can be equalized by appropriately tailoring the refractive index profile of the fiber for a particular wavelength or wavelength range. An acceptable refractive index profile has the highest refractive index at the fiber core and a variation of the refractive index within the core which is substantially parabolic.

Many thousands of kilometers of multimode fiber have been installed in which the refractive index profile is nominally a modified-parabolic distribution. A method of making fiber having this index gradient is the modified chemical vapour deposition (MCVD) method patented by McChesney et al, U.S. Pat. No. 4,217,027. In this method, germania doped silica is deposited on the inside of a pure silica tube as a soot. Subsequently the soot is fused at high temperature and the tube is collapsed and drawn into a fiber. The germania doped silica forms the core of the fiber and the pure silica its cladding. By suitably altering the content of germania during the deposition phase the refractive index gradient of the fiber core can be made parabolic. As previously mentioned, much of the multimode fiber currently in operating fiber optic transmission lines is made by this method.

One inevitable anomaly within the refractive index of fiber made using the MCVD process is a central refractive index dip which detracts from the desired modified-parabolic index gradient. The refractive index dip results from dopant loss during the consolidation and collapse stages of the manufacturing process.

Investigations of standard fiber made by the McChesney et al method show that mode groups responsible for increased inter-modal dispersion are spatially localized. On scanning the output end of a fiber into which a pulse has been coupled a pre-pulse may be seen which is localized generally on the fiber axis, the pre-pulse slightly preceding the main output pulse. Since there is little mode conversion occuring at wavelengths of interest to light wave communications, very little light in a mode travelling essentially along the fiber axis is converted into the modes travelling in the outer part of the core and vice versa. Typically when a laser, modulated at a particular frequency, is spliced to an 8 kilometer length of a standard graded index multimode fiber having a −3 dB bandwidth of 600 MHz-km, there is a difference in arrival time of the light of almost 5 nanoseconds between the center and the outside of the fiber core. This results in a minimum in the received 100 MHz AC signal at 6 microns from the core center. This is due to the near cancellation of the two mode groups which are of approximately equal power at this position and are 180° out of phase.

SUMMARY OF THE INVENTION

According to one aspect of the invention, there is provided a method of increasing bandwidth of a multimode optical fiber transmission line by coupling it to a short length of fiber adapted to strongly attenuate certain mode groups without attenuating other mode groups of different order.

Preferably the length of fiber functions to attenuate low order modes propagating substantially along the core axis.

Attenuation can be produced by a fiber having a highly attenuating central region to absorb these centrally travelling modes.

Alternatively, the attenuation can be achieved using a fiber with a large diameter central dip in the refractive index profile to inhibit the propagation of these modes. Typically such a large diameter central dip is of the order of 12 microns in diameter. The fiber can be attached to the multimode transmission line either at the beginning of a line or can be inserted into the line. Several such lengths of fiber can be coupled along the length of a transmission line.

According to another aspect of the invention, there is provided a multimode fiber transmission line having coupled thereto a short length of fiber adapted to strongly attenuate certain mode groups without attenuating other mode groups of different order.

Particularly for use in improving the bandwidth of a multimode fiber thre is provided a compensating fiber having a core and a cladding the core having a generally parabolic refractive index profile, the profile dipping at the center of the fiber, the central low refractive index region having a diameter of at least 12 microns and having a refractive index substantially lower than the index of an immediately adjacent part of the core.

Preferably for silica based transmission lines, the refractive index at the center of the core is about 1.458 at 589 mm being essentially that of silica and the refractive index immediately adjacent to the low index central region is in the range 1.465 to 1.480.

The numerical apertures of the transmission line and the compensating fiber should be nominally equal to avoid splice losses.

BRIEF DESCRIPTION OF THE DRAWINGS

An embodiment of the invention will now be described by way of example with reference to the accompanying drawings in which.

DETAILED DESCRIPTION OF THE PREFERRED EMBODIMENTS

Figure 1:
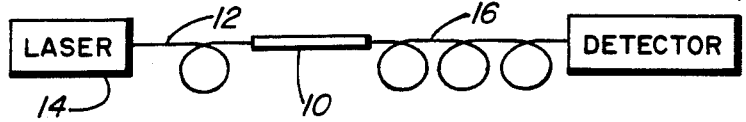
FIG. 1 is a schematic view of a multimode optical transmission line in which modal dispersion is reduced by a method according to the invention.

Referring in detail to FIG. 1, a 1 meter section of a compensating fiber 10 is spliced into a transmission link between a pigtail fiber 12 from a semiconductor laser 14 and a multimode transmission fiber 16.

Figure 2:
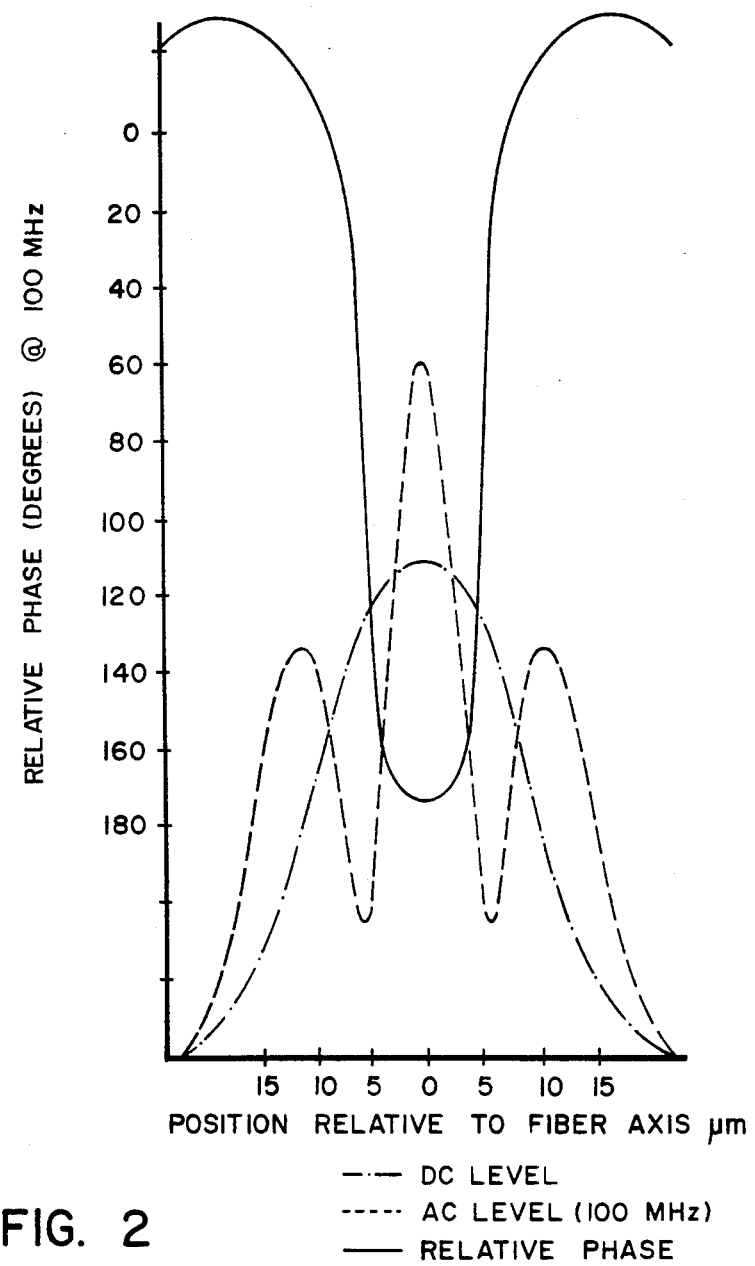
FIG. 2 shows the relative phase of light received at the output end of a multimode optical transmission line.

Omitting the compensating fiber 10, the relative phase at the end of an 8 kilometer length of the transmission line 16 is as shown in FIG. 2, plot (c). Within a central axial region of the transmission line corresponding generally to a central dip in the refractive index profile, the light arrives at the end point of the transmission line about 5 nanoseconds before light in the outer part of the core. As shown in FIG. 2, plot (b), at a modulating frequency of 100 megahertz, a minimum is produced in the modulated signal at a region of about 6 microns from the fiber central axis. At this point the two dominant mode groups are exactly 180° out of phase and cancellation occurs. At this point, as shown by the DC content (a) of the modulating signal, the signal levels of the two mode groups are approximately equal. It is clear from plot (c) that if the signal content is removed from the central core region to a diameter of 12 microns, then light is transmitted only in those mode groups which are more-or-less in phase.

Figure 3:
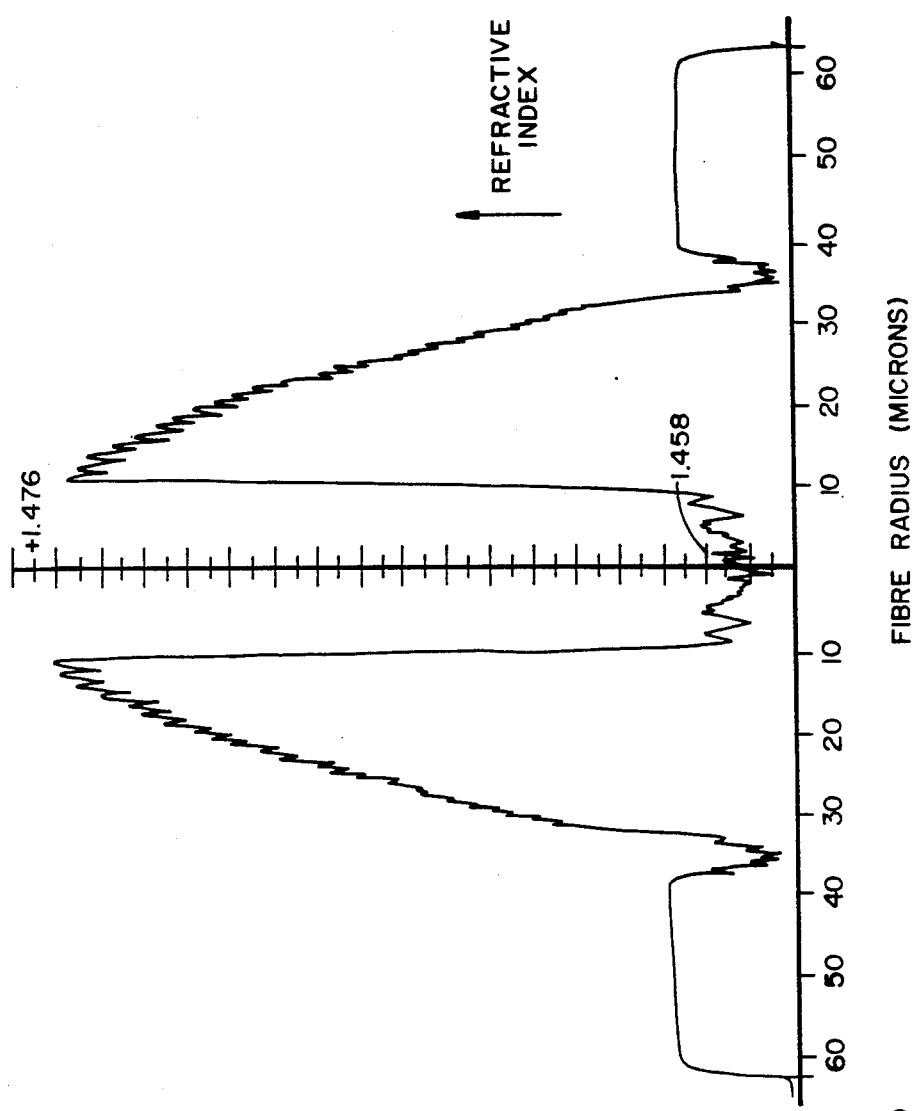
FIG. 3 shows the refractive index profile of fiber used to increase bandwidth of a multimode optical transmission line.

Referring to FIG. 3 a compensating fiber for removing the centrally propagating modes has a cladding diameter of 125 microns with a cladding refractive index of 1.458, and a core having an index variation corresponding essentially to the equation $n(r)=n(0)\,\text{sech}\,Ar$ where $n(r)$ is the refractive index at a distance $r$ from the fiber core, $n(0)$ is the refractive index at the core, and $A$ is a constant. However this profile is modified by a central dip at which the refractive index has an average value of 1.458 over a diameter of 12 microns. The fiber can be made using a particular form of the modified chemical vapour deposition method in which several anti-diffusion layers of fluorine doped silica are initially deposited onto the inside surface of a silica tube. Subsequently several layers of germanica doped silica are deposited on the inside of the tube, with germania content increasing gradually to form a desired index profile, the germania doped silica being followed by several more layers of pure silica or fluorine doped silica. The dopant content and layer thickness are chosen to achieve the profile shown in FIG. 3. A tube so prepared is heated to consolidate the deposited soot into fused glass and the tube is then collapsed and drawn into a fiber.

A length of compensating fiber of 1 meter has been found sufficient to exclude the centrally travelling modes from the transmission line.

The compensating element is placed at the input end of the fiber rather than at the output end in order to establish the preferred modal distribution at the beginning of the link.

As an alternative to the low index central region of the fiber, it can merely be made lossy by including in the deposited silica several parts per million of a dopant such as iron which is strongly absorbent in the spectral region of interest.

Figure 4:
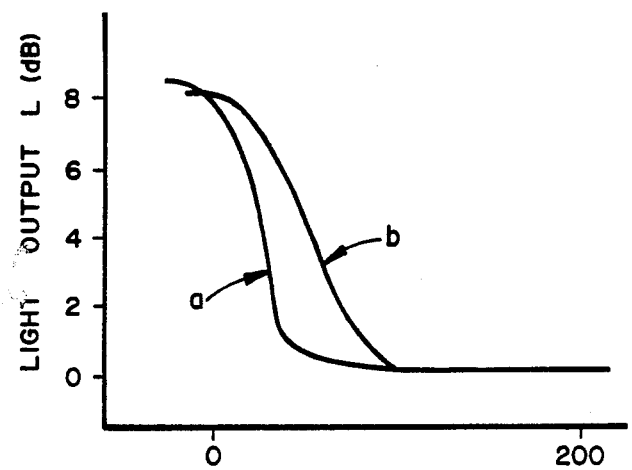
FIG. 4 shows the bandwidth of a multimode optical transmission line to which compensating fiber is coupled, and, in contrast, the same transmission line to which no compensating fiber is coupled.

Referring to FIG. 4, there is shown an example of the improvement which can be obtained by using the compensating fiber of the invention. As shown in the graph of FIG. 4, a 25 kilometer standard MCVD produced multimode link has a light output (L), frequency (f) plot as shown at (a). However with a 1 meter length of the compensating fiber spliced between the laser pigtail fiber and the transmission fiber the bandwidth is improved as shown in the plot (b).

Figure 5A:
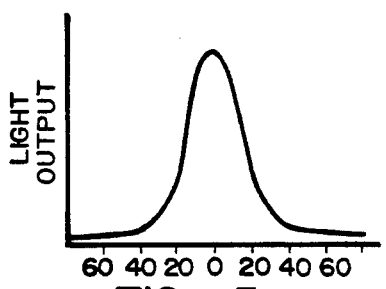
FIG. 5 shows in graphical form the near field output of a multimode transmission line, firstly in which no compensating fiber is coupled to the transmission line (FIG. 5a) and then with a compensating fiber coupled to the transmission line (FIG. 5b).
Figure 5B:
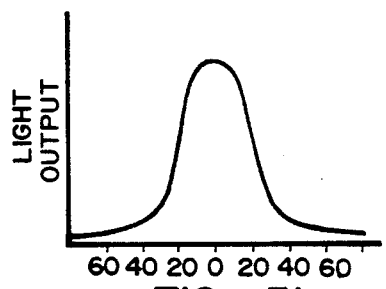

As shown in FIG. 5 which indicates the actual near field output (a) without, and (b) with, compensating fiber, again for a 25 kilometer optical transmission line, the received light is concentrated more centrally in (a) than in (b) which confirms that a redistribution of the modal power has been effected by the compensating fiber.

The basis of the invention is to exclude the mode groups which travel through the fiber at a speed different from that of other mode groups.

The tendency for mode groups to become spatially separated arises because of the criticality of the index profile near the central axis of the fiber. Any deviation of the index from the optimum profile in the central region has a far greater influence on modal dispersion than does a corresponding deviation in refractive index in an outer region of the core since a larger fraction of the light is carried in the former region. As mentioned previously, MCVD fiber is characterized by a specific index dip. However any flattening of the index profile at the central region can have a corresponding effect on the modal dispersion.

What is claimed is:

1. An apparatus, comprising: a multimode optical fiber transmission line having a light input end, and a short length of fiber having the characteristic of strongly attenuating at least one light mode group passed through said fiber without attenuating other mode groups of different order, said short length of fiber having a low refractive index central core region for attenuating an axially propagating mode group and having a light output end coupled to said light input end of said multimode optical fiber transmission line.

2. An apparatus as claimed in claim 1 in which the low refractive index central core region of the short length of fiber occupies a diameter of about 12 microns.

3. An apparatus as claimed in claim 1 in which the short length of fiber has a refractive index profile which is substantially parabolic increasing from a minimum at an outer part of the core to a maximum at a region about 5 microns from the center of the core, the parabolic refractive index profile being modified by a low index central region.

4. An apparatus as claimed in claim 3 in which the low index central region is silica doped with an index depressing material and the part of the core immediately around said central low index region is silica doped with an index raising material.

5. An apparatus as claimed in claim 1 in which the central region of the short length of fiber is strongly absorbing.

6. an apparatus as claimed in claim 5 in which the absorbing region comprises silica containing a light absorbing dopant.

7. An apparatus as claimed in claim 3 wherein said multimode optical transmission line has a substantially parabolic refractive index which dips at the center.

8. A method, comprising: providing a multimode optical fiber transmission line; and coupling to said line a short length of fiber having the characteristic of strongly attenuating at least one light mode group passed through said fiber without attenuating other mode groups of different order and having a low refractive index central core region for attenuating an axially propagating mode group.

9. A method as claimed in claim 8, including the steps of forming said short length of fiber with a core and a cladding, forming the core with a generally parabolic refractive index profile which dips at the center of the short length of fiber and has a central low refractive index region with a diameter of at least 12 microns and a refractive index substantially lower than the index of an immediately adjacent part of the core.

10. A method as claimed in claim 9, including the steps of forming said multimode optical transmission line using an MCVD process to have a substantially parabolic refractive index which dips at the center.

* * * * *